(12) United States Patent
Nagai

(10) Patent No.: US 9,862,790 B2
(45) Date of Patent: *Jan. 9, 2018

(54) POLYVINYL ACETAL MICROPARTICLES FOR WATER-BASED DISPERSION

(71) Applicant: SEKISUI CHEMICAL CO., LTD., Osaka (JP)

(72) Inventor: Yasuharu Nagai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,967

(22) Filed: Sep. 19, 2016

(65) Prior Publication Data

US 2017/0002126 A1 Jan. 5, 2017

Related U.S. Application Data

(63) Continuation of application No. 14/431,321, filed as application No. PCT/JP2013/075664 on Sep. 24, 2013, now Pat. No. 9,505,865.

(30) Foreign Application Priority Data

Sep. 28, 2012 (JP) ................. 2012-218730
Sep. 28, 2012 (JP) ................. 2012-218731
Jul. 23, 2013 (JP) ................. 2013-153036

(51) Int. Cl.
| | |
|---|---|
| C08F 261/12 | (2006.01) |
| C08K 5/103 | (2006.01) |
| C08K 5/12 | (2006.01) |
| C08L 29/14 | (2006.01) |
| C08F 8/34 | (2006.01) |
| C08L 51/00 | (2006.01) |

(52) U.S. Cl.
CPC .............. *C08F 261/12* (2013.01); *C08F 8/34* (2013.01); *C08K 5/103* (2013.01); *C08K 5/12* (2013.01); *C08L 29/14* (2013.01); *C08L 51/003* (2013.01); *C08L 2201/54* (2013.01); *Y10T 428/2982* (2015.01)

(58) Field of Classification Search
CPC ......... C08F 261/12; C08K 5/103; C08K 5/12; C08L 29/14

USPC ........................................................ 524/557
See application file for complete search history.

(56) References Cited

U.S. PATENT DOCUMENTS

| | | | |
|---|---|---|---|
| 5,559,175 A | 9/1996 | Kroggel et al. | |
| 6,121,349 A | 9/2000 | Fischer et al. | |
| 2002/0115785 A1* | 8/2002 | Weitzel ................ | C08F 261/04 |
| | | | 524/832 |

FOREIGN PATENT DOCUMENTS

| | | |
|---|---|---|
| JP | 57-177005 | 10/1982 |
| JP | 6-206930 | 7/1994 |
| JP | 8-7253 | 1/1996 |
| JP | 8-113608 | 5/1996 |
| JP | 10-139812 | 5/1998 |
| JP | 10-204204 | 8/1998 |
| JP | 2004-161901 | 6/2004 |
| JP | 2005-334767 | 12/2005 |
| JP | 2005334767 A * | 12/2005 |
| JP | 4849791 | 1/2012 |

OTHER PUBLICATIONS

Extended European Search Report dated May 23, 2016 in corresponding European Application No. 13841658.1.
International Preliminary Report on Patentability dated Mar. 31, 2015 in International (PCT) Application No. PCT/JP2013/075664.
International Search Report dated Dec. 10, 2013 in International (PCT) Application No. PCT/JP2013/075664.

* cited by examiner

*Primary Examiner* — Michael M Bernshteyn
(74) *Attorney, Agent, or Firm* — Wenderoth, Lind & Ponack, L.L.P.

(57) ABSTRACT

The present invention provides polyvinyl acetal fine particles for an aqueous dispersion which exhibit excellent dispersion stability in a water-containing dispersion medium, and allow for formation of a film having sufficient mechanical strength and flexibility without voids and non-uniform structures such as irregularities, and an aqueous dispersion of the polyvinyl acetal fine particles for an aqueous dispersion. The polyvinyl acetal fine particles for an aqueous dispersion, adapted for use as dispersoids in an aqueous dispersion, the polyvinyl acetal fine particles including a polyvinyl acetal resin with an ionic functional group, and having a volume average particle size of 10 nm to 100 μm, and a CV value of a volume-based particle size distribution of at most 40%.

5 Claims, No Drawings

POLYVINYL ACETAL MICROPARTICLES FOR WATER-BASED DISPERSION

TECHNICAL FIELD

The present invention relates to polyvinyl acetal fine particles for an aqueous dispersion which exhibit excellent dispersion stability in a water-containing dispersion medium, and allow for formation of a film having sufficient mechanical strength and flexibility without voids and non-uniform structures such as irregularities, an aqueous dispersion of the polyvinyl acetal fine particles for an aqueous dispersion, and a method for preparing the polyvinyl acetal fine particles for an aqueous dispersion.

BACKGROUND ART

Polyvinyl acetal resin is used in a wide range of applications including wash primers used in metal treatment, various paint compositions, adhesives, resin treating agents, and ceramic binders. Recently, the range of its applications has been expanded to include the electronic material field. In these applications, polyvinyl acetal resin is used in the form of a solution in an organic solvent or an aqueous dispersion.

In light of issues such as environmental pollution, toxicity to human body, and risks in use, more attempts have been made to develop a system mainly made of water which can be used in place of systems containing an organic solvent. This trend has been increasing the importance of polyvinyl acetal aqueous dispersions.

For the production of polyvinyl acetal resin as fine particles, acetalization of polyvinyl alcohol by a precipitation method has been employed. Unfortunately, fine particles of polyvinyl acetal resin prepared by such a method, when dispersed in a dispersion medium mainly made of water, may coagulate into large aggregates, or precipitate within a short period of time upon standing. Once precipitates have formed, they cannot be readily redispersed by stirring or the like. Thus, it is very difficult to maintain the particles dispersed in the medium for a long period of time. For this reason, polyvinyl acetal resin has been typically used as a binder resin dissolved in an organic solvent, and the use of fine particles of polyvinyl acetal resin in the form of an aqueous dispersion has been difficult to achieve.

Aqueous dispersion compositions of a polyvinyl acetal resin that is modified to have improved dispersibility in an aqueous medium have been known as countermeasures to this problem, and RS-3120 (Solutia Inc.) is a typical example thereof.

However, such conventional aqueous dispersion compositions of a polyvinyl acetal resin contain a dispersant, such as potassium oleate or sodium oleate, which makes the dispersions alkaline with a pH of approximately 9. As the pH becomes close to neutral, the dispersing effect of the dispersant decreases, causing the polyvinyl acetal resin to precipitate. In particular, when a compound with high acidity is added to such an aqueous dispersion, the pH around the compound is lowered to cause precipitation even before the pH of the overall aqueous dispersion becomes close to neutral.

As an example of aqueous dispersion compositions of a polyvinyl acetal resin which exhibit stable dispersibility in a neutral pH range, Patent Literature 1 discloses an aqueous dispersion composition of a polyvinyl acetal resin containing at least one dispersant selected from the group consisting of polyoxyethylene tridecyl ethers, polyoxyethylene oleyl ethers, polyoxyethylene lauryl ethers, polyoxyethylene sorbitan monooleates, sodium lauryl sulfate, and potassium lauryl sulfate.

However, the use of these dispersants is also not effective enough to provide sufficient dispersibility in a liquid medium mainly made of water. Another problem is that these dispersants are contained in large amounts in dispersion compositions, and films formed by drying the compositions may have low mechanical properties.

Polymer fine particles have found many applications in the fields of delustrants, anti-block agents, chromatographic carriers, medicine carriers, powder paint compositions, gap adjusters, electrophotographic toners, electrorheological fluids, cosmetics and the like. Polymer fine particles for these applications should have a small particle size and a small particle size distribution, and in particular, in the fields of paint compositions, toners and the like, particles that allow for formation of a film without voids and non-uniform structures such as irregularities are required.

So far, polymer fine particles obtained by a "technique to produce particles by polymerization", such as emulsion polymerization, suspension polymerization, seed polymerization, or dispersion polymerization, have been used in these applications. Unfortunately, polymer fine particles obtained by emulsion polymerization or suspension polymerization have particle sizes within a limited range and have a broad particle size distribution. Resin particles obtained by seed polymerization or dispersion polymerization are very expensive although they have a sharp particle size distribution.

Polyvinyl acetal resin is a product of acetalization of a polyvinyl alcohol material with an aldehyde, and production of fine particles of polyvinyl acetal resin by the "technique to produce particles by polymerization" has been very difficult.

Although the precipitation method is currently employed to produce fine particles of polyvinyl acetal resin by acetalization of polyvinyl alcohol, fine particles obtained by this method include assemblies of small primary particles, and thus are not spherical fine particles.

Patent Literature 2 discloses spherical porous particles which are obtainable by adding an aqueous solution prepared by mixing an aldehyde and a water-soluble polymer that turns into a gel by ion exchange with polyvinyl alcohol, dropwise to an acid solution, and causing drops to coagulate by the reaction between the polyvinyl alcohol and the aldehyde. Although particles produced by this method are spherical, their porous structure is not suited to the above-mentioned applications. Additionally, the particle size of the particle product is large.

CITATION LIST

Patent Literature

Patent Literature 1: JP 4849791 B
Patent Literature 2: JP H10-204204 A

SUMMARY OF INVENTION

Technical Problem

An object of the present invention is to provide polyvinyl acetal fine particles for an aqueous dispersion which exhibit excellent dispersion stability in a water-containing dispersion medium, and allow for formation of a film having sufficient mechanical strength and flexibility without voids and non-uniform structures such as irregularities, an aqueous dispersion of the polyvinyl acetal fine particles for an aqueous dispersion, and a method for producing the polyvinyl acetal fine particles for an aqueous dispersion.

Solution to Problem

The present invention provides polyvinyl acetal fine particles for an aqueous dispersion, adapted for use as dispersoids in an aqueous dispersion, the polyvinyl acetal fine particles including a polyvinyl acetal resin with an ionic functional group, and having a volume average particle size of 10 nm to 100 μm, and a CV value of a volume-based particle size distribution of at most 40%.

The following is offered to illustrate the present invention in detail.

The present inventors found that polyvinyl acetal fine particles including a polyvinyl acetal resin with a particular functional group, and having a volume average particle size and a CV value of the volume average particle size within predetermined ranges exhibit excellent dispersion stability in a water-containing dispersion medium, and can be readily redispersed even when precipitates have formed.

Another finding is that an aqueous dispersion of such polyvinyl acetal fine particles allows for formation of a film having sufficient mechanical strength and flexibility. Thus, the present invention was completed.

The polyvinyl acetal fine particles for an aqueous dispersion of the present invention include a polyvinyl acetal resin with an ionic functional group.

The ionic functional group is preferably at least one functional group selected from the group consisting of carboxyl, sulfonic acid, sulfinic acid, sulfenic acid, phosphate, phosphonic acid, and amino groups, and salts thereof. In particular, carboxyl and sulfonic acid groups, and salts thereof are more preferable, and a sulfonic acid group and a salt thereof are particularly preferable.

Preferably, the polyvinyl acetal resin has an ionic functional group content of 0.01 to 1 mmol/g. If the ionic functional group content is less than 0.01 mmol/g, the fine particles may have low dispersibility, and may provide a film with voids or non-uniform structures such as irregularities. If the ionic functional group content is more than 1 mmol/g, the fine particles may provide a film with low mechanical properties. The content is more preferably 0.02 to 0.5 mmol/g.

The polyvinyl acetal resin preferably has a degree of acetalization, determined as a total degree of acetalization, of 40 to 80 mol % in either case of a pure aldehyde or a mixed aldehyde. If the total degree of acetalization is less than 40 mol %, the polyacetal resin is water-soluble, and therefore cannot be formed into an aqueous dispersion. If the total degree of acetalization is more than 80 mol %, the polyvinyl acetal resin has excessively high hydrophobicity, making it difficult to prepare a stable dispersion. The degree of acetalization is more preferably 55 to 75 mol %.

In particular, the polyvinyl acetal resin is preferably a resin obtainable by acetalization of a polyvinyl alcohol having a degree of polymerization of 200 to 5000, and a degree of saponification of at least 80 mol %. A polyvinyl acetal resin with a degree of polymerization and a degree of saponification of within the above ranges is excellent in terms of preparation of an aqueous dispersion, provides an aqueous dispersion composition that is excellent in terms of ease of application and ease of film formation by drying, and allows for formation of a film having excellent strength and flexibility.

If the degree of polymerization is less than 200, the polyvinyl acetal resin may provide a film with low mechanical strength. If the degree of polymerization is more than 5000, a solution prepared for the acetalization has excessively high viscosity, making it difficult for the acetalization to take place. The degree of polymerization is more preferably 800 to 4500.

If the degree of saponification is less than 80 mol %, the polyvinyl alcohol is less likely to dissolve in water, making it difficult for the acetalization to take place. Additionally, such a polyvinyl alcohol is less likely to be acetalized because it contains fewer hydroxy groups. The degree of saponification is more preferably at least 85 mol %.

The acetalization can be carried out by any method without particular limitation, and conventionally known methods can be used. One example thereof is to add an aldehyde of any kind to an aqueous solution of the polyvinyl alcohol in the presence of an acid catalyst such as hydrochloric acid.

Any aldehyde can be used in the acetalization without particular limitation, and examples include formaldehyde (including paraformaldehyde), acetaldehyde (including paracetaldehyde), propionaldehyde, butyl aldehyde, amyl aldehyde, hexyl aldehyde, heptyl aldehyde, 2-ethylhexyl aldehyde, cyclohexyl aldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. In particular, acetaldehyde or butyl aldehyde is preferable in terms of factors such as productivity and the balance of properties. Any of these aldehydes may be used alone, or two or more of these may be used in combination.

The ionic functional group may be present as a part directly introduced to the polyvinyl acetal resin main chain, or the polyvinyl acetal resin may be a polyvinyl acetal resin having a graft chain (hereinafter, simply referred to as grafted copolymer) which contains the ionic functional group in the graft chain.

In the case where the ionic functional group is present in the graft chain, the polyvinyl acetal main chain of the polymer is maintained. This allows for formation of a film provided with high mechanical properties without losing excellent mechanical properties of the polyvinyl acetal resin. Additionally, alteration or the like of the ionic functional group introduced can be avoided.

In the case where the ionic functional group is directly introduced to the polyvinyl acetal resin main chain, the polyvinyl acetal resin preferably has a chain-like molecular structure in which the ionic functional group is bound to a carbon atom in the polymer main chain. In this case, it is more preferable that the ionic functional group is bound to a carbon atom in the polymer main chain via a particular structure.

The presence of a particular structure in the bond between the ionic functional group and the polymer main chain ensures excellent dispersion stability in a dispersion medium mainly made of water, and additionally allows for formation of a film with high mechanical strength and flexibility by drying off the dispersion medium.

The particular structure is preferably a group including a hydrocarbon, and in particular, is preferably an alkylene group having one or more carbons, a cyclic alkylene group having five or more carbons, or an aryl group having six or more carbons, for example.

The upper limit of the carbon number is not particularly limited, but is preferably 200 or less, more preferably 50 or less, and still more preferably 20 or less.

In the case where the polyvinyl acetal resin has a chain-like molecular structure in which the ionic functional group is bound to a carbon atom in the polymer main chain, the polyvinyl acetal resin preferably includes a structure unit represented by the following formula (1). The presence of a structure unit represented by the formula (1) in the polyvinyl acetal resin allows the polyvinyl acetal fine particles for an aqueous dispersion of the present invention to exhibit excellent dispersion stability in a dispersion medium mainly made of water, and additionally allows for formation of a film with high mechanical strength and flexibility by drying off the dispersion medium.

[Chem. 1]

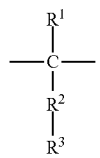

(1)

In the formula (1), C is the carbon atom in the polymer main chain, $R^1$ represents a hydrogen atom or a methyl group, $R^2$ represents an alkylene group with one or more carbons, and $R^3$ represents the ionic functional group.

The presence of a structure unit represented by the formula (1) in the polyvinyl acetal resin with an ionic functional group allows the polyvinyl acetal fine particles for an aqueous dispersion to exhibit excellent dispersion stability in a water-containing dispersion medium, and to be readily redispersed even when precipitates have formed.

This may be because since $R^2$ in the formula (1), which binds the ionic functional group to the polymer main chain of the polyvinyl acetal resin, increases the mobility of the ionic functional group, the fine particles, when dispersed in a dispersion medium mainly made of water, are rearranged, so that the ionic functional group on the surface of the fine particles is oriented towards the dispersion medium, thereby increasing the affinity of the polyvinyl acetal fine particles for an aqueous dispersion to the dispersion medium.

In the case where the polyvinyl acetal resin with an ionic functional group includes a structure unit represented by the formula (1), a film with high mechanical strength and flexibility can be formed by drying off the dispersion medium. This may be because as the dispersion medium is dried off, the ionic functional group migrates from the surface of fine particles to the inside of the fine particles, so that the particles are bonded to one another strongly.

$R^1$ is particularly preferably a hydrogen atom.

$R^2$ may be, for example, a methylene, ethylene, propylene, isopropylene, butylene, isobutylene, sec-butylene, or tert-butylene group. In particular, $R^2$ is preferably a methylene group.

$R^2$ may be a structure substituted with a hetero atom-containing substituent. The substituent may be, for example, an ester, ether, sulfide, amide, amine, sulfoxide, ketone, or hydroxy group.

The polyvinyl acetal resin in which the ionic functional group is directly introduced to the polyvinyl acetal resin main chain can be produced by any method without particular limitation, and the following methods can be mentioned as examples: a method involving acetalization by the reaction of a modified polyvinyl alcohol material having the ionic functional group with an aldehyde; and a method involving preparing a polyvinyl acetal resin, and then reacting the polyvinyl acetal resin with a compound having the ionic functional group and another functional group reactive with a functional group of the polyvinyl acetal resin.

The following method can be mentioned as an example of a method for preparing the modified polyvinyl alcohol having the ionic functional group: a method involving copolymerizing a vinyl ester monomer, such as vinyl acetate, with a monomer including a structure represented by the formula (2), and then saponifying ester moieties of the resulting copolymer resin with an alkali or acid.

[Chem. 2]

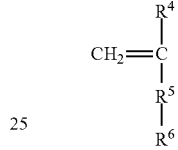

(2)

In the formula (2), $R^4$ represents a hydrogen atom or a methyl group, $R^5$ represents an alkylene group with one or more carbons, and $R^6$ represents the ionic functional group.

The monomer including a structure represented by the formula (2) is not particularly limited, and examples include monomers with a carboxyl group and a polymerizable functional group, such as 3-butenoic acid, 4-pentenoic acid, 5-hexenoic acid, and 9-decenoic acid, monomers with a sulfonic acid group and a polymerizable functional group, such as allyl sulfonic acid, 2-methyl-2-propene-1-sulfonic acid, 2-acrylamide-2-methylpropanesulfonic acid, and 3-(methacryloyloxy)propanesulfonic acid, monomers with an amino group and a polymerizable functional group, such as N,N-diethylallylamine, and salts thereof.

In particular, allyl sulfonic acid and a salt thereof are preferably used because they provide excellent dispersion stability in a dispersion medium mainly made of water and allow for formation of a film with high mechanical strength and flexibility by drying off the dispersion medium. In particular, sodium allyl sulfonate is preferably used.

Any of these monomers may be used alone, or two or more of these may be used in combination.

$R^4$ is particularly preferably a hydrogen atom.

Examples of $R^5$ include methylene, ethylene, propylene, isopropylene, butylene, isobutylene, sec-butylene, and tert-butylene groups. In particular, $R^5$ is preferably a methylene group.

$R^5$ may be a structure substituted with a hetero atom-containing substituent. The substituent may be, for example, an ester, ether, sulfide, amide, amine, sulfoxide, ketone, or hydroxy group.

The amount of the structure unit represented by the formula (1) in the polyvinyl acetal resin is preferably adjusted such that the ionic functional group content of the polyvinyl acetal resin is within the above-mentioned suitable range.

In the case where the ionic functional group content of the polyvinyl acetal resin is within the above-mentioned range, the polyvinyl acetal resin fine particles for an aqueous dispersion, when used as dispersoids in an aqueous dispersion, exhibit improved dispersion stability in a dispersion, and allows for formation of a film that is excellent in both the strength and flexibility.

The grafted copolymer can be produced by any method without particular limitation, and examples include a method involving radical polymerization of a polymerizable monomer with the ionic functional group in the presence of polyvinyl acetal and a hydrogen abstraction-type polymerization initiator.

The polymerization can be carried out by any method without particular limitation, and examples include conventionally known polymerization methods such as solution polymerization, emulsion polymerization, suspension polymerization, and bulk polymerization.

Any solvent can be used in the solution polymerization without particular limitation, and examples include ethyl acetate, toluene, dimethyl sulfoxide, ethanol, acetone, diethyl ether, tetrahydrofuran, and solvent mixtures of these.

The hydrogen abstraction-type polymerization initiator is not particularly limited, and is preferably a t-butyl peroxy peroxide such as di-t-butyl peroxide, t-butyl peroxypivalate, t-butyl peroxy-2-ethylhexanoate, t-butyl peroxyacetate, t-butyl peroxy-3,5,5-trimethylhexanoate, t-butyl peroxylaurate, t-butylperoxyisopropyl monocarbonate, t-butylperoxy neopentanoate, t-butylperoxy neodecanoate, t-butylperoxy-2-ethylhexyl monocarbonate, 2,2-di(t-butylperoxy)butane, 1,1-di(t-butylperoxy)cyclohexane, or t-butyl peroxybenzoate.

The graft chain of the grafted copolymer preferably includes a polymer of a (meth)acrylic monomer. In this case, the ionic functional group can be efficiently introduced to the polyvinyl acetal resin. This allows the polyvinyl acetal fine particles for an aqueous dispersion of the present invention to exhibit high dispersion stability in a dispersion medium mainly made of water.

Specifically, the graft chain is preferably introduced by using a (meth)acrylic monomer with the ionic functional group.

Examples of the (meth)acrylic monomer with the ionic functional group include (meth)acrylic acid, (meth) acrylamide, aminoethyl (meth)acrylate, dimethylaminoethyl (meth)acrylate, 2-sulfoethyl (meth)acrylate, 3-sulfopropyl (meth)acrylate, 2-(meth)acrylamide-2-methylpropanesulfonic acid, 2-(meth)acryloyloxyethyl acid phosphate, phenyl (2-(meth)acryloyloxyethyl)phosphate, 3-(meth)acryloxypropyl phosphonic acid, sodium (meth)acrylate, potassium (meth)acrylate, sodium 2-sulfoethyl (meth)acrylate, potassium 2-sulfoethyl (meth)acrylate, sodium 3-sulfopropyl (meth)acrylate, and potassium 3-sulfopropyl(meth) acrylate.

The degree of grafting of the polymerizable monomer with the ionic functional group onto the polyvinyl acetal resin (the ratio of units of the polymerizable monomer with the ionic functional group to polyvinyl acetal units in the grafted copolymer) is not particularly limited as long as the ionic functional group content of the polyvinyl acetal resin is within the above-mentioned suitable range. Preferably, the degree of grafting is 0.001 to 100% by weight. In the case where the degree of grafting is within this range, the fine particles, when used as dispersoids in an aqueous dispersion, allow for formation of a film that is excellent in both the strength and flexibility. The degree of grafting is preferably 0.1 to 15% by weight.

The term "degree of grafting" herein refers to the ratio of units of the polymerizable monomer with the ionic functional group to polyvinyl acetal units in the grafted copolymer, and the degree can be evaluated as follows, for example. A resin solution is prepared and dried at 110° C. for 1 hour, and the residue is dissolved in methanol. The methanol solution is added dropwise to water, and the resulting mixture is centrifuged into soluble and insoluble fractions. The insoluble fraction is collected as the grafted copolymer. The grafted copolymer thus obtained is analyzed by NMR to calculate the weight of polyvinyl acetal units and the weight of units of the polymerizable monomer with the ionic functional group. The degree of grafting can be calculated by the following formula (3).

$$\text{Degree of grafting of polymerizable monomer with ionic functional group (\%)} = \{(\text{weight of unit of polymerizable monomer with ionic functional group})/(\text{weight of polyvinyl acetal unit})\} \times 100 \quad (3)$$

In the case where the polyvinyl acetal resin has a graft chain including the ionic functional group, an additional (meth)acrylic monomer may be used in combination with the (meth)acrylic monomer with the ionic functional group.

Examples of the additional (meth)acrylic monomer include monofunctional (meth)acrylic acid alkyl esters, monofunctional (meth)acrylic acid cyclic alkyl esters, and monofunctional (meth)acrylic acid aryl esters.

Examples of the monofunctional (meth)acrylic acid alkyl esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, lauryl (meth)acrylate, stearyl (meth)acrylate, isotetradecyl (meth)acrylate, and 2-isocyanatoethyl (meth)acrylate.

Examples of the monofunctional (meth)acrylic acid cyclic alkyl esters include cyclohexyl (meth)acrylate and isobornyl (meth)acrylate.

Examples of the monofunctional (meth)acrylic acid aryl esters include phenyl (meth)acrylate and benzyl (meth) acrylate.

The term "(meth)acrylic acid" herein is a generic name of acrylic acid and methacrylic acid, and the term "(meth) acrylate" is a generic name of acrylates and methacrylates.

The degree of grafting of the additional (meth)acrylic monomer onto the grafted copolymer (the ratio of units of the additional (meth)acrylic polymer to polyvinyl acetal units in the grafted copolymer) depends on intended applications, and therefore is not particularly limited. Preferably, the degree is at most 900% by weight. In the case where the degree is within this range, the fine particles, when used as dispersoids in an aqueous dispersion, allow for formation of a film that is excellent in both the strength and flexibility.

The phrase "degree of grafting of the additional (meth) acrylic monomer" refers to a ratio of units of the additional (meth)acrylic polymer to polyvinyl acetal units in the grafted copolymer, and the degree can be evaluated as follows. A resin solution is prepared, and dried at 110° C. for 1 hour, and the residue is dissolved in xylene to be separated into soluble and insoluble fractions. The insoluble fraction is collected as the grafted copolymer, and the grafted copolymer thus obtained is analyzed by NMR to calculate the weight of units of the additional (meth)acrylic polymer and the weight of polyvinyl acetal units. The degree of grafting can be calculated by the following formula (4).

$$\text{Degree of grafting of additional (meth)acrylic polymer (\%)} = \{(\text{weight of unit of additional (meth) acrylic polymer})/(\text{weight of unit of polyvinyl acetal})\} \times 100 \quad (4)$$

The molecular weight of the polyvinyl acetal resin with an ionic functional group is not particularly limited. Preferably, the number average molecular weight (Mn) thereof is 10,000 to 400,000, the weight average molecular weight (Mw) thereof is 20,000 to 800,000, and the ratio of these molecular weights (Mw/Mn) is 2.0 to 40. In the case where Mn, Mw, and Mw/Mn are within these ranges, the fine particles, when used as dispersoids in an aqueous dispersion, allows for formation of a film that is excellent in both the strength and flexibility.

The lower limit of the volume average particle size of the polyvinyl acetal fine particles for an aqueous dispersion of the present invention is 10 nm, and the upper limit thereof is 100 μm. It is difficult to practically produce fine particles with a volume average particle size of less than 10 nm, and fine particles with a volume average particle size of more than 100 μm cannot be prepared into a stable dispersion because they precipitate fast in a dispersion. The preferable lower limit of the volume average particle size is 20 nm, the preferable upper limit is 50 μm, the more preferable lower limit is 30 nm, the more preferable upper limit is 30 μm, the still more preferable lower limit is 50 nm, and the still more preferable upper limit is 10 μm.

The volume average particle size of the polyvinyl acetal fine particles for an aqueous dispersion can be measured using a laser diffraction/scattering particle size distribution analyzer or the like.

Regarding the volume average particle size of the polyvinyl acetal fine particles for an aqueous dispersion of the present invention, the upper limit of the CV value is 40%. If the CV value is more than 40%, the polyvinyl acetal fine particles include fine particles with a larger particle size, which are likely to precipitate, and cannot be prepared into a stable dispersion. Additionally, when the polyvinyl acetal fine particles are applied to a substrate by wet coating or wet spraying, and formed into a film by, for example, melting the fine particles, air is trapped to form voids in the resulting film or the resulting film may have non-uniform structures such as irregularities on the surface due to a variety of particle sizes.

The upper limit of the CV value is preferably 35%, more preferably 30%, and still more preferably 20%. The CV value is a percentage (%) determined by dividing the standard deviation by the volume average particle size.

The polyvinyl acetal fine particles for an aqueous dispersion of the present invention preferably have an average sphericity of at least 0.9. In this case, the polyvinyl acetal fine particles, when applied to a substrate by wet coating or wet spraying and formed into a film by, for example, melting the fine particles, are less likely to trap air, and therefore less likely to form voids. Additionally, since no non-uniform structures such as irregularities are formed on the surface of the resulting film, the film has sufficient mechanical strength and flexibility. If the average sphericity is less than 0.9, air is trapped in the process of forming a film, and the resulting film may have voids or non-uniform structures such as irregularities on the surface. The average sphericity is more preferably at least 0.95, and still more preferably at least 0.98.

The sphericity (minor axis/major axis) can be determined by analyzing, using an image analyzer, an electron microscopic photograph taken with a scanning electron microscope (SEM), and the average sphericity can be calculated as the average of the sphericity values calculated for, for example, randomly selected 100 fine particles in the electron microscopic photograph by determining their minor axis and major axis based on visual observation.

The polyvinyl acetal fine particles for an aqueous dispersion of the present invention can be produced by any method without particular limitation, and specifically, can be produced by preparing the polyvinyl acetal resin with an ionic functional group, and then forming the polyvinyl acetal resin into particles, for example.

As examples of methods for preparing the polyvinyl acetal resin with an ionic functional group, the following methods can be mentioned: a method involving acetalization by the reaction of a modified polyvinyl alcohol material having the ionic functional group with an aldehyde; a method involving preparing a polyvinyl acetal resin, and then reacting the polyvinyl acetal resin with a compound having another functional group reactive with a functional group of the polyvinyl acetal resin; and a method involving grafting a polymerizable monomer with the ionic functional group to a polyvinyl acetal resin using a hydrogen abstraction-type polymerization initiator.

In particular, the grafting method is preferable because this method allows for formation of a film provided with high mechanical properties without losing excellent mechanical properties of the polyvinyl acetal resin, and does not cause alteration or the like of the functional groups introduced.

In the case where the ionic functional group is directly introduced to the polyvinyl acetal resin main chain, the ionic functional group is bound to the polymer main chain via the above-mentioned particular structure to provide excellent dispersion stability in a dispersion medium mainly made of water and allow for formation of a film with high mechanical strength and flexibility by drying off the dispersion medium.

Examples of methods for forming the polyvinyl acetal resin into particles include a method involving dissolving the polyvinyl acetal resin with an ionic functional group in an organic solvent, adding water portion by portion to the solution, and removing the organic solvent by heating and/or decompressing; a method involving adding a solution of the polyvinyl acetal resin with an ionic functional group to a large amount of water, and removing the organic solvent optionally by heating and/or decompressing; and a method involving adding water portion by portion to the polyvinyl acetal resin with an ionic functional group under heating at an elevated pressure while kneading the polyvinyl acetal resin with an ionic functional group with a kneader at a temperature of not lower than the glass transition temperature of the polyvinyl acetal resin. In particular, preferred is the method involving dissolving the polyvinyl acetal resin with an ionic functional group in an organic solvent, adding water to the solution portion by portion, and removing the organic solvent by heating and/or decompressing or the method involving adding a solution of the polyvinyl acetal resin with an ionic functional group to a large amount of water, and removing the organic solvent optionally by heating and/or decompressing because these methods facilitate control of the volume average particle size of the polyvinyl acetal fine particles for an aqueous dispersion of the present invention, and reduce the CV value of the volume average particle size.

In the case where any of the above-mentioned method is used for formation of particles of, in particular, the polyvinyl acetal resin with an ionic functional group in which the ionic functional group is directly introduced to the polyvinyl acetal resin main chain, the resulting polyvinyl acetal fine particles for an aqueous dispersion have a relatively small volume average particle size of at most 1 μm, and a small CV value of the volume average particle size. In the case where the polyvinyl acetal resin having the ionic functional group in a graft chain is formed into particles by any of the above-mentioned methods, the resulting polyvinyl acetal fine particles for an aqueous dispersion have a relatively large volume average particle size of at least 100 nm, and a small CV value of the volume average particle size.

In particular, the polyvinyl acetal fine particles for an aqueous dispersion of the present invention are preferably produced by a method involving preparing the polyvinyl acetal resin with an ionic functional group, then dissolving the polyvinyl acetal resin in an organic solvent, and causing fine particles of the polyvinyl acetal for an aqueous dispersion to precipitate.

Such a method allows for formation of uniform fine particles for an aqueous dispersion of the polyvinyl acetal in the step of causing fine particles of the polyvinyl acetal for an aqueous dispersion to precipitate, and the resulting fine particles are less likely to adhere to each other. As a result, spherical fine particles having a narrow volume-based particle size distribution and a high average sphericity can be obtained.

The step of dissolving the polyvinyl acetal resin in an organic solvent allows for precise control of the particle size, and formation of fine particles having a high average sphericity.

Examples of the organic solvent include tetrahydrofuran, acetone, toluene, methyl ethyl ketone, ethyl acetate, and alcohols such as methanol, ethanol, butanol, and isopropyl alcohol.

Water may be used in combination with the organic solvent.

In the step of dissolving the polyvinyl acetal resin in an organic solvent, the polyvinyl acetal resin is preferably dissolved to a concentration of 0.1 to 20% by weight.

If the polyvinyl acetal resin concentration is less than 0.1% by weight, it takes long to remove the organic solvent and water, resulting in reduced productivity of the polyvinyl acetal fine particles for an aqueous dispersion.

If the polyvinyl acetal resin concentration is more than 20% by weight, the polyvinyl acetal solution has too high a viscosity to be in the uniformly dissolved state. This may result in polyvinyl acetal fine particles for an aqueous dispersion having a wide volume-based particle size distribution out of the target range.

The concentration is more preferably 0.3 to 15% by weight.

In the present invention, the step of causing fine particles of the polyvinyl acetal for an aqueous dispersion to precipitate is performed subsequently.

Specifically, heating and/or decompressing, centrifugation, or the like is performed to remove the organic solvent.

In the case where water is used, it is preferable to remove water at the same time.

Typically, the polyvinyl acetal fine particles for an aqueous dispersion of the present invention are intended to be dispersed in a water-containing dispersion medium, and to be used in the form of an aqueous dispersion. Such an aqueous dispersion is also one aspect of the present invention.

The dispersion medium used for the aqueous dispersion of the present invention should contain water, and may be a solvent mixture containing water and an organic solvent. In the case where the dispersion medium contains an organic solvent, the organic solvent content of the dispersion medium is preferably at most 40% by weight because too much organic solvent may reduce the storage stability of the aqueous dispersion. The content is more preferably at most 30% by weight.

The water content of the aqueous dispersion of the present invention is 40 to 1000 parts by weight per 100 parts by weight of the polyvinyl acetal resin. If the amount of water is excessively small, the solids content is excessively high, which may be accompanied by low dispersibility, and the polyvinyl acetal resin aqueous dispersion has excessively high viscosity, and may not be easy to apply. If the amount of water is excessively large, the solids content is small, and a film formed by application may not be uniform.

Although the aqueous dispersion of the present invention has sufficient dispersion stability, a dispersant may be further added in an amount that does not impair the mechanical properties of a film to be formed.

The aqueous dispersion of the present invention may contain a plasticizer. The use of a plasticizer allows for formation of a film with better flexibility. The plasticizer is not particularly limited, but is preferably a plasticizer compatible with the polyvinyl acetal resin. Examples include diesters of phthalic acid such as dioctyl phthalate (DOP) and dibutyl phthalate (DBP), diesters of adipic acid such as dioctyl adipate, diesters of alkylene glycol such as triethyleneglycol-di-2-ethylhexanoate, tetraethyleneglycol-di-2-ethylhexanoate, triethyleneglycol-di-2-ethylbutylate, tetraethyleneglycol-di-2-ethylbutylate, tetraethyleneglycol-di-heptanoate, and triethyleneglycol-di-heptanoate. DOP and triethyleneglycol-di-2-ethylhexanoate are preferable because they are less volatile and are likely to ensure flexibility of sheets.

The plasticizer in the aqueous dispersion is preferably impregnated in the polyvinyl acetal fine particles. In the case where the plasticizer is impregnated in the polyvinyl acetal fine particles, a film with high mechanical strength and flexibility without local concentration of the plasticizer can be formed by drying off the dispersion medium. The plasticizer can be regarded as being impregnated in the polyvinyl acetal fine particles when no droplet of the plasticizer is visually observed in the aqueous dispersion to which the plasticizer has been added.

The amount of the plasticizer impregnated in the polyvinyl acetal fine particles is not particularly limited, and may be, for example, 1 to 50% by weight per 100% by weight of the polyvinyl acetal fine particles and the plasticizer in total. The amount is more preferably 2 to 25% by weight, and particularly preferably 5 to 15% by weight.

The polyvinyl acetal fine particles impregnated with the plasticizer can be prepared by adding the plasticizer to an aqueous dispersion of the polyvinyl acetal fine particles, and vigorously stirring the mixture of the aqueous dispersion and the plasticizer.

Advantageous Effects of Invention

The present invention provides polyvinyl acetal fine particles for an aqueous dispersion which exhibit excellent dispersion stability in a water-containing dispersion medium, and allow for formation of a film having sufficient mechanical strength and flexibility without voids and non-uniform structures such as irregularities, an aqueous dispersion of the polyvinyl acetal fine particles for an aqueous dispersion, and a method for preparing the polyvinyl acetal fine particles for an aqueous dispersion.

DESCRIPTION OF EMBODIMENTS

The following examples are offered to demonstrate embodiments of the present invention in more details, and are not to be construed as limiting the present invention.

EXAMPLE 1

Into a reactor equipped with a thermometer, a stirrer, a nitrogen introduction pipe, and a condenser tube, 25 parts by weight of a polyvinyl acetal resin (degree of polymerization: 800, degree of butyralization: 65.0 mol %, hydroxy group content: 33.8 mol %, acetyl group content: 1.2 mol %), 1 part by weight of sodium 2-sulfoethyl methacrylate and 100 parts by weight of dimethyl sulfoxide were charged, and the polyvinylbutyral and sodium 2-sulfoethyl methacrylate were dissolved in the mixture with stirring. Next, the reactor was flushed with nitrogen gas for 30 minutes to purge the reactor with nitrogen, and the contents of the reactor were heated to 85° C. with stirring. After 30 minutes, 0.5 parts by weight of t-butylperoxy-2-ethylhexanoate, which serves as a polymerization initiator, was diluted with 5 parts by weight of dimethyl sulfoxide, and the resulting polymerization initiator solution was added dropwise to the reactor over 3 hours. Then, the mixture was further reacted at 85° C. for 3 hours, and the reaction solution was cooled, followed by precipitation into water three times. The precipitates were sufficiently dried. Thus, a polyvinyl acetal resin including a polyvinyl acetal resin grafted with sodium 2-sulfoethyl methacrylate was obtained. The obtained polyvinyl acetal resin was measured by NMR (JNM-ECA 400 available from JEOL Ltd.) for the degree of acetalization, acetyl group content, hydroxy group content, degree of grafting, and ionic functional group content. The results are shown in Table 1. The resin was also measured for the weight average molecular weight against a polystyrene standard by GPC using a column "2690 Separations Model" available from Waters, and the determined weight average molecular weight is shown in Table 1.

Next, 10 parts by weight of the obtained polyvinyl acetal resin was dissolved in 150 parts by weight of methanol, and the resulting solution was added dropwise to 300 parts by weight of water. The mixture was stirred under reduced pressure with the temperature maintained at 30° C. to evaporate methanol. The mixture was then concentrated to a solids content of 20% by weight. In this manner, an aqueous dispersion of the polyvinyl acetal fine particles was obtained.

EXAMPLE 2

Into a reactor equipped with a thermometer, a stirrer, a nitrogen introduction pipe, and a condenser tube, 25 parts by weight of a polyvinyl acetal resin (degree of polymerization: 800, degree of butyralization: 65.0 mol %, hydroxy group content: 33.8 mol %, acetyl group content: 1.2 mol %), 1 part by weight of methacrylic acid and 100 parts by weight of dimethyl sulfoxide were charged, and the polyvinylbutyral was dissolved in the mixture with stirring. Next, the reactor was flushed with nitrogen gas for 30 minutes to purge the reactor with nitrogen, and the contents of the reactor were heated to 85° C. with stirring. After 30 minutes, 0.5 parts by weight of t-butylperoxy-2-ethylhexanoate, which serves as a polymerization initiator, was diluted with 5 parts by weight of dimethyl sulfoxide, and the resulting polymerization initiator solution was added dropwise to the reactor over 3 hours. Then, the mixture was further reacted at 85° C. for 3 hours, and the reaction solution was cooled, followed by precipitation into water three times. The precipitates were sufficiently dried. Thus, a polyvinyl acetal resin including a polyvinyl acetal resin grafted with methacrylic acid was obtained. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

The same procedures as in Example 1 were performed using the obtained polyvinyl acetal resin to prepare an aqueous dispersion of the polyvinyl acetal fine particles.

EXAMPLE 3

Into a reactor equipped with a thermometer, a stirrer, a nitrogen introduction pipe, and a condenser tube, 25 parts by weight of a polyvinyl acetal resin (degree of polymerization: 800, degree of butyralization: 65.0 mol %, hydroxy group content: 33.8 mol %, acetyl group content: 1.2 mol %), 1 part by weight of dimethylaminoethyl methacrylate, and 100 parts by weight of dimethyl sulfoxide were charged, and the polyvinylbutyral was dissolved in the mixture with stirring. Next, the reactor was flushed with nitrogen gas for 30 minutes to purge the reactor with nitrogen, and the contents of the reactor were heated to 85° C. with stirring. After 30 minutes, 0.5 parts by weight of t-butylperoxy-2-ethylhexanoate, which serves as a polymerization initiator, was diluted with 5 parts by weight of dimethyl sulfoxide, and the resulting polymerization initiator solution was added dropwise to the reactor over 3 hours. Then, the mixture was further reacted at 85° C. for 3 hours, and the reaction solution was cooled, followed by precipitation into water three times. The precipitates were sufficiently dried. Thus, a polyvinyl acetal resin including a polyvinyl acetal resin grafted with dimethylaminoethyl acrylate was obtained. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

The same procedures as in Example 1 were performed using the obtained polyvinyl acetal resin to prepare an aqueous dispersion of the polyvinyl acetal fine particles.

EXAMPLE 4

A polyvinyl acetal resin including a polyvinyl acetal resin grafted with sodium 2-sulfoethyl methacrylate was obtained by performing the same procedures as in Example 1, except that the amount of sodium 2-sulfoethyl methacrylate was changed to 0.1 parts by weight. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

The same procedures as in Example 1 were performed using the obtained polyvinyl acetal resin to prepare an aqueous dispersion of the polyvinyl acetal fine particles.

EXAMPLE 5

A polyvinyl acetal resin including a polyvinyl acetal resin grafted with sodium 2-sulfoethyl methacrylate was obtained by performing the same procedures as in Example 1, except that the amount of sodium 2-sulfoethyl methacrylate was changed to 5 parts by weight. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

The same procedures as in Example 1 were performed using the obtained polyvinyl acetal resin to prepare an aqueous dispersion of the polyvinyl acetal fine particles.

EXAMPLE 6

A polyvinyl acetal resin including a polyvinyl acetal resin grafted with sodium 2-sulfoethyl methacrylate was obtained by performing the same procedures as in Example 1, except that the polyvinyl acetal resin used had a degree of polymerization of 300, a degree of butyralization of 68.0 mol %, a hydroxy group content of 31.0 mol %, and an acetyl group content of 1.0 mol %. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1. The same procedures as in Example 1 were performed using the obtained polyvinyl acetal resin to prepare an aqueous dispersion of the polyvinyl acetal fine particles.

EXAMPLE 7

A polyvinyl acetal resin including a polyvinyl acetal resin grafted with sodium 2-sulfoethyl methacrylate was obtained by performing the same procedures as in Example 1, except that the polyvinyl acetal resin used had a degree of polymerization of 3300, a degree of butyralization of 67.0 mol %, a hydroxy group content of 32.0 mol %, and an acetyl group content of 1.0 mol %. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

The same procedures as in Example 1 were performed using the obtained polyvinyl acetal resin to prepare an aqueous dispersion of the polyvinyl acetal fine particles.

EXAMPLE 8

In 1000 parts by weight of pure water, 100 parts by weight of a polyvinyl alcohol (degree of polymerization: 800, degree of saponification: 99 mol %, amount of copolymerized acrylic acid: 0.7 mol %) was added, and dissolved by stirring at 90° C. for approximately 2 hours. The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product. Subsequently, the temperature was maintained at 30° C. for 3 hours to complete the reaction. Neutralization, water rinse, and drying were performed by standard methods to afford a polyvinyl acetal resin as white powder. The obtained polyvinyl acetal resin was measured by NMR, and found to have a degree of butyralization of 68 mol %, a hydroxy group content of 30.3 mol %, an acetyl group content of 1 mol %, and an ionic functional group content of 0.1 mmol/g. The resin was measured for the weight average molecular weight in the same manner as in Example 1. Table 1 shows the result.

The same procedures as in Example 1 were performed using the obtained polyvinyl acetal resin to prepare an aqueous dispersion of the polyvinyl acetal fine particles.

EXAMPLE 9

A polyvinyl acetal resin including a polyvinyl acetal resin grafted with sodium 2-sulfoethyl methacrylate was obtained by performing the same procedures as in Example 1, except that the polyvinyl acetal resin used had a degree of polymerization of 1700, a degree of butyralization of 48.0 mol %, a degree of acetoacetalization of 24 mol %, a hydroxy group content of 27.0 mol %, and an acetyl group content of 1.0 mol %. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

The same procedures as in Example 1 were performed using the obtained polyvinyl acetal resin to prepare an aqueous dispersion of the polyvinyl acetal fine particles.

EXAMPLE 10

In 1000 parts by weight of pure water, 100 parts by weight of a polyvinyl alcohol (degree of polymerization: 800, degree of saponification: 99 mol %, amount of copolymerized sodium allylsulfonate: 1 mol %) was added, and dissolved by stirring at 90° C. for approximately 2 hours.

The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford a polyvinyl acetal resin as white powder.

The obtained polyvinyl acetal resin was measured by NMR, and found to have a degree of butyralization of 67 mol %, a hydroxy group content of 31 mol %, an acetyl group content of 1 mol %, and an ionic functional group content of 0.2 mmol/g. The resin was measured for the weight average molecular weight in the same manner as in Example 1. Table 1 shows the result.

The same procedures as in Example 1 were performed using the obtained polyvinyl acetal resin to prepare an aqueous dispersion of the polyvinyl acetal fine particles.

EXAMPLE 11

In 1000 parts by weight of pure water, 100 parts by weight of a polyvinyl alcohol (degree of polymerization: 800, degree of saponification: 99 mol %, amount of copolymerized sodium allylsulfonate: 0.5 mol %) was added, and dissolved by stirring at 90° C. for approximately 2 hours.

The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford a polyvinyl acetal resin as white powder.

The obtained polyvinyl acetal resin was measured by NMR, and found to have a degree of butyralization of 67 mol %, a hydroxy group content of 31 mol %, an acetyl group content of 1 mol %, and an ionic functional group content of 0.1 mmol/g. The resin was measured for the weight average molecular weight in the same manner as in Example 1. Table 1 shows the result.

The same procedures as in Example 1 were performed using the obtained polyvinyl acetal resin to prepare an aqueous dispersion of the polyvinyl acetal fine particles.

EXAMPLE 12

In 1000 parts by weight of pure water, 100 parts by weight of a polyvinyl alcohol (degree of polymerization: 800, degree of saponification: 99 mol %, amount of copolymerized sodium 2-methyl-2-propene-1-sulfonate: 1 mol %) was added, and dissolved by stirring at 90° C. for approximately 2 hours.

The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford a polyvinyl acetal resin as white powder.

The obtained polyvinyl acetal resin was measured by NMR, and found to have a degree of butyralization of 67 mol %, a hydroxy group content of 31 mol %, an acetyl group content of 1 mol %, and an ionic functional group content of 0.1 mmol/g. The resin was measured for the weight average molecular weight in the same manner as in Example 1. Table 1 shows the result.

The same procedures as in Example 1 were performed using the obtained polyvinyl acetal resin to prepare an aqueous dispersion of the polyvinyl acetal fine particles.

EXAMPLE 13

In 1000 parts by weight of pure water, 100 parts by weight of a polyvinyl alcohol (degree of polymerization: 800, degree of saponification: 99.5 mol %, amount of copolymerized vinylsulfonic acid: 0.5 mol %) was added, and dissolved by stirring at 90° C. for approximately 2 hours.

The solution was cooled to 40° C., 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford a polyvinyl acetal resin as white powder.

The obtained polyvinyl acetal resin was measured by NMR, and found to have a degree of butyralization of 67.5 mol %, a hydroxy group content of 31 mol %, an acetyl group content of 1 mol %, and an ionic functional group content of 0.1 mmol/g. The resin was measured for the weight average molecular weight in the same manner as in Example 1. Table 1 shows the result.

The same procedures as in Example 1 were performed using the obtained polyvinyl acetal resin to prepare an aqueous dispersion of the polyvinyl acetal fine particles.

EXAMPLE 14

To the aqueous dispersion of polyvinyl acetal fine particles prepared in Example 10 was added triethyleneglycol-di-2-ethylhexanoate (3GO) as a plasticizer in an amount of 10% by weight of the polyvinyl acetal fine particles. Next, the dispersion was stirred for 1 hour, whereby an aqueous dispersion containing the plasticizer was prepared. No droplet of the plasticizer was visually observed in the aqueous dispersion containing the plasticizer. This confirmed that the plasticizer was impregnated in the polyvinyl acetal fine particles.

EXAMPLE 15

To the aqueous dispersion of polyvinyl acetal fine particles prepared in Example 10 was added dioctylphthalate (DOP) as a plasticizer in an amount of 7% by weight of the polyvinyl acetal fine particles. Next, the dispersion was stirred for 1 hour, whereby an aqueous dispersion containing the plasticizer was prepared. No droplet of the plasticizer was visually observed in the aqueous dispersion containing the plasticizer. This confirmed that the plasticizer was impregnated in the polyvinyl acetal fine particles.

COMPARATIVE EXAMPLE 1

In 150 parts by weight of methanol, 10 parts by weight of a polyvinyl acetal resin (degree of polymerization: 800, degree of butyralization: 68.0 mol %, hydroxy group content: 31.0 mol %, acetyl group content: 1.0 mol %) was dissolved, and the resulting solution was added dropwise to 300 parts by weight of water. The mixture was stirred under reduced pressure with the temperature maintained at 30° C. to evaporate methanol. When the mixture was further concentrated to a solids content of 20% by weight, aggregates of the polyvinyl acetal resin occurred. Thus, an aqueous dispersion of fine particles could not be obtained.

COMPARATIVE EXAMPLE 2

In 150 parts by weight of methanol, 10 parts by weight of a polyvinyl acetal resin (degree of polymerization: 800, degree of butyralization: 68.0 mol %, hydroxy group content: 31.0 mol %, acetyl group content: 1.0 mol %) was dissolved, and potassium oleate was added to the resulting solution as a dispersant in an amount of 10% by weight of the polyvinyl acetal resin. The resulting solution was added dropwise to 300 parts by weight of water. The mixture was stirred under reduced pressure with the temperature maintained at 30° C. to evaporate methanol. The mixture was then concentrated to a solids content of 20% by weight. Thus, an aqueous dispersion of polyvinyl acetal particles was obtained.

COMPARATIVE EXAMPLE 3

A polyvinyl acetal resin grafted with 2-hydroxyethyl methacrylate was obtained by performing the same procedures as in Example 1, except that 2-hydroxyethyl methacrylate was used in place of sodium 2-sulfoethyl methacrylate. The obtained polyvinyl acetal resin was measured in the same manner as in Example 1 for the degree of acetalization, acetyl group content, hydroxy group content, degree of grafting, ionic functional group content, and weight average molecular weight. The results are shown in Table 1.

In 150 parts by weight of methanol, 10 parts by weight of the obtained polyvinyl acetal resin was dissolved, and the resulting solution was added dropwise to 300 parts by weight of water. The mixture was stirred under reduced pressure with the temperature maintained at 30° C. to evaporate methanol. When the mixture was further concentrated to a solids content of 20% by weight, aggregates of the polyvinyl acetal resin occurred. Thus, an aqueous dispersion of fine particles could not be obtained.

COMPARATIVE EXAMPLE 4

In 1000 parts by weight of pure water, 100 parts by weight of a polyvinyl alcohol (degree of polymerization: 800, degree of saponification: 99 mol %, amount of copolymerized cyclohexyl methacrylate: 1 mol %) was added, and dissolved by stirring at 90° C. for approximately 2 hours.

The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford a polyvinyl acetal resin as white powder.

The obtained polyvinyl acetal resin was measured by NMR, and found to have a degree of butyralization of 67 mol %, a hydroxy group content of 31 mol %, an acetyl group content of 1 mol %, and an ionic functional group content of 0 mmol/g. The resin was measured for the weight average molecular weight in the same manner as in Example 1. Table 1 shows the result.

Next, 10 parts by weight of the obtained resin was dissolved in 150 parts by weight of methanol, and the resulting solution was added dropwise to 300 parts by weight of water. The mixture was stirred under reduced pressure with the temperature maintained at 30° C. to evaporate methanol. When the resulting mixture was further concentrated to a solids content of 20% by weight, aggregates of the polyvinyl acetal resin occurred. Thus, an aqueous dispersion of fine particles could not be obtained.
(How to Evaluate)

The polyvinyl acetal resin fine particles and the aqueous dispersions of polyvinyl acetal fine particles thus obtained were evaluated for their properties by the methods described below. Table 1 shows the results.
(1) Measurement of Particle Size The polyvinyl acetal resin fine particles were measured for the volume average particle size and volume-based particle size distribution with a laser diffraction/scattering particle size distribution analyzer (LA-950 available from HORIBA, Ltd.).

(2) Measurement of Average Sphericity

The polyvinyl acetal resin fine particles were measured for the average sphericity by observation with a scanning electron microscope. The average sphericity was calculated by measuring the sphericity of randomly selected 100 polyvinyl acetal resin fine particles in an electron microscopic photograph by image analysis of the individual particles with an image analyzer, and averaging their sphericity values.
(3) Evaluation of Dispersibility The aqueous dispersions of polyvinyl acetal fine particles were left standing for 24 hours, and evaluated for the dispersibility of polyvinyl acetal fine particles based on the following criteria.
OO (Excellent): Particles were completely dispersed without precipitates.
O (Good): Most of particles were dispersed with only a few precipitates.
x (Poor): All particles were precipitated.
(4) Evaluation of Redispersibility The aqueous dispersions of polyvinyl acetal fine particles were evaluated based on the following criteria for whether the polyvinyl acetal fine particles can be redispersed by stirring after precipitation of polyvinyl acetal fine particles in a centrifuge.
OO (Excellent): Particles were completely dispersed by stirring in less than 10 minutes.
O (Good): Particles were completely dispersed by stirring for 10 minutes or more and 1 hour or less.
x (Poor): Particles were not dispersed.
(5) Evaluation of Film Uniformity The aqueous dispersions of polyvinyl acetal fine particles were individually applied to a PET film, and dried at 80° C. for 60 minutes, and then at 160° C. for 15 minutes. Thus, laminates of a polyvinyl acetal film and PET were obtained. Each polyvinyl acetal film was separated from PET, and evaluated for the film uniformity based on the following criteria by observation with a microscope.
OO (Excellent): No void and irregularity were observed.
O (Good): No void but some irregularities were observed.
x (Poor): Voids and irregularities were observed.
(6) Film Strength The aqueous dispersions of polyvinyl acetal fine particles were individually applied to a PET film, and dried at 80° C. for 60 minutes, and then at 160° C. for 15 minutes. Thus, laminates of a 30 μm thick polyvinyl acetal film and PET were obtained. Each polyvinyl acetal film was separated from PET, and subjected to a tensile test to measure breaking stress and elongation.

TABLE 1

| | Polyvinyl acetal | | | | | | | |
|---|---|---|---|---|---|---|---|---|
| | | Degree of acetalization (mol %) | | Acetyl | Hydroxy | Degree of | Weight | |
| | Degree of polymerization | Degree of butyralization | Degree of acetoacetalization | group content (mol %) | group content (mol %) | grafting (% by weight) | average molecular weight | Ionic group Compound |
| Example 1 | 800 | 64.6 | — | 1.2 | 33.6 | 2 | 200000 | Sodium 2-sulfoethyl methacrylate |
| Example 2 | 800 | 63.6 | — | 1.2 | 33.1 | 3 | 180000 | Methacrylic acid |
| Example 3 | 800 | 64.2 | — | 1.2 | 33.4 | 3 | 190000 | Dimethylaminoethyl methacrylate |

TABLE 1-continued

| Example | | | | | | | | |
|---|---|---|---|---|---|---|---|---|
| Example 4 | 800 | 65 | — | 1.2 | 33.8 | 0.2 | 190000 | Sodium 2-sulfoethyl methacrylate |
| Example 5 | 800 | 62.6 | — | 1.15 | 32.5 | 12 | 240000 | Sodium 2-sulfoethyl methacrylate |
| Example 6 | 300 | 67.6 | — | 1 | 30.8 | 2 | 60000 | Sodium 2-sulfoethyl methacrylate |
| Example 7 | 3300 | 66.6 | — | 1 | 31.8 | 2 | 750000 | Sodium 2-sulfoethyl methacrylate |
| Example 8 | 800 | 68 | — | 1 | 30.3 | — | 150000 | Acrylic acid |
| Example 9 | 1700 | 47.7 | 23.9 | 1 | 26.8 | 2 | 300000 | Sodium 2-sulfoethyl methacrylate |
| Example 10 | 800 | 67 | — | 1 | 31 | — | 180000 | Sodium allylsulfonate |
| Example 11 | 800 | 67 | — | 1 | 31 | — | 180000 | Sodium allylsulfonate |
| Example 12 | 800 | 67 | — | 1 | 31 | — | 190000 | Sodium 2-methyl-2-propene-1-sulfonate |
| Example 13 | 800 | 67.5 | — | 1 | 31 | — | 160000 | Vinylsulfonic acid |
| Example 14 | 800 | 67 | — | 1 | 31 | — | 180000 | Sodium allylsulfonate |
| Example 15 | 800 | 67 | — | 1 | 31 | — | 180000 | Sodium allylsulfonate |
| Comparative Example 1 | 800 | 68 | — | 1 | 31 | — | 170000 | — |
| Comparative Example 2 | 800 | 68 | — | 1 | 31 | — | 170000 | — |
| Comparative Example 3 | 800 | 64.4 | — | 1.2 | 33.5 | 2 | 190000 | — |
| Comparative Example 4 | 800 | 67 | — | 1 | 31 | — | 160000 | — |

| | Ionic group | | Production of fine particles | | Added dispersant | | Added plasticizer | |
|---|---|---|---|---|---|---|---|---|
| | Functional group | Ionic functional group content of resin (mmol/g) | Amount of polyvinyl acetal resin (parts by weight) | Amount of organic solvent (parts by weight) | Compound | Amount (expressed as % by weight of resin) | Compound | Amount (expressed as % by weight of resin) |
| Example 1 | Sulfonate | 0.1 | 10 | 150 | — | — | — | — |
| Example 2 | Carboxylic acid | 0.3 | 10 | 150 | — | — | — | — |
| Example 3 | Amino group | 0.2 | 10 | 150 | — | — | — | — |
| Example 4 | Sulfonate | 0.01 | 10 | 150 | — | — | — | — |
| Example 5 | Sulfonate | 0.6 | 10 | 150 | — | — | — | — |
| Example 6 | Sulfonate | 0.1 | 10 | 150 | — | — | — | — |
| Example 7 | Sulfonate | 0.1 | 10 | 150 | — | — | — | — |
| Example 8 | Carboxylic acid | 0.1 | 10 | 150 | — | — | — | — |
| Example 9 | Sulfonate | 0.1 | 10 | 150 | — | — | — | — |
| Example 10 | Sulfonate | 0.2 | 10 | 150 | — | — | — | — |
| Example 11 | Sulfonate | 0.1 | 10 | 150 | — | — | — | — |
| Example 12 | Sulfonate | 0.1 | 10 | 150 | — | — | — | — |
| Example 13 | Sulfonic acid | 0.1 | 10 | 150 | — | — | — | — |
| Example 14 | Sulfonate | 0.2 | 10 | 150 | — | — | 3GO | 10 |
| Example 15 | Sulfonate | 0.2 | 10 | 150 | — | — | DOP | 7 |
| Comparative Example 1 | — | — | 10 | 150 | — | — | — | — |
| Comparative Example 2 | — | — | 10 | 150 | Potassium oleate | 10 | — | — |
| Comparative Example 3 | — | 0 | 10 | 150 | — | — | — | — |
| Comparative Example 4 | — | 0 | 10 | 150 | — | — | — | — |

TABLE 1-continued

| | Evaluation | | | | | | | |
|---|---|---|---|---|---|---|---|---|
| | Particle size | | | Dispersibility | | Film | Film | Elongation |
| | Average (μm) | CV (%) | Average sphericity | Dispersibility | Redispersibility | uniformity | strength (N/mm²) | (%) |
| Example 1 | 0.2 | 15 | 0.98 | ⊚ | ⊚ | ⊚ | 53 | 100 |
| Example 2 | 1 | 19 | 0.96 | ○ | ○ | ⊚ | 55 | 70 |
| Example 3 | 2 | 25 | 0.97 | ○ | ○ | ⊚ | 50 | 80 |
| Example 4 | 0.3 | 17 | 0.98 | ⊚ | ○ | ⊚ | 53 | 110 |
| Example 5 | 0.1 | 14 | 0.98 | ⊚ | ⊚ | ⊚ | 51 | 100 |
| Example 6 | 0.2 | 15 | 0.98 | ⊚ | ⊚ | ⊚ | 35 | 110 |
| Example 7 | 0.1 | 19 | 0.98 | ⊚ | ⊚ | ⊚ | 85 | 100 |
| Example 8 | 8 | 31 | 0.92 | ○ | ○ | ⊚ | 30 | 60 |
| Example 9 | 0.2 | 16 | 0.98 | ⊚ | ⊚ | ⊚ | 55 | 90 |
| Example 10 | 0.02 | 15 | 0.98 | ⊚ | ⊚ | ⊚ | 54 | 130 |
| Example 11 | 0.03 | 15 | 0.98 | ⊚ | ⊚ | ⊚ | 56 | 130 |
| Example 12 | 0.06 | 16 | 0.96 | ⊚ | ⊚ | ⊚ | 52 | 120 |
| Example 13 | 0.1 | 19 | 0.92 | ○ | ○ | ⊚ | 30 | 60 |
| Example 14 | 0.04 | 17 | 0.98 | ⊚ | ⊚ | ⊚ | 38 | 250 |
| Example 15 | 0.04 | 17 | 0.98 | ⊚ | ⊚ | ⊚ | 42 | 210 |
| Comparative Example 1 | — | — | — | — | — | — | — | — |
| Comparative Example 2 | 13 | 55 | 0.83 | x | x | ○ | 10 | 10 |
| Comparative Example 3 | — | — | — | — | — | — | — | — |
| Comparative Example 4 | — | — | — | — | — | — | — | — |

EXAMPLE 16

Into a reactor equipped with a thermometer, a stirrer, a nitrogen introduction pipe, and a condenser tube, 25 parts by weight of a polyvinyl acetal resin material (degree of polymerization: 1000, degree of butyralization: 66.0 mol %, hydroxy group content: 33.0 mol %, acetyl group content: 1.0 mol %), 0.5 parts by weight of sodium 2-sulfoethyl methacrylate, and 100 parts by weight of dimethyl sulfoxide were charged, and the polyvinylbutyral and sodium 2-sulfoethyl methacrylate were dissolved in the mixture with stirring. Next, the reactor was flushed with nitrogen gas for 30 minutes to purge the reactor with nitrogen, and the contents of the reactor were heated to 85° C. with stirring. After 30 minutes, 0.5 parts by weight of t-butylperoxy-2-ethylhexanoate, which serves as a polymerization initiator, was diluted with 5 parts by weight of dimethyl sulfoxide, and the resulting polymerization initiator solution was added dropwise to the reactor over 3 hours. Then, the mixture was further reacted at 85° C. for 3 hours. The reaction solution was cooled, followed by precipitation into water three times. The precipitates were sufficiently dried. Thus, a polyvinyl acetal resin grafted with sodium 2-sulfoethyl methacrylate was obtained. The resulting polyvinyl acetal resin was measured by NMR (JNM-ECA 400 available from JEOL Ltd.), and found to have an ionic functional group content of 0.05 mmol/g. The polyvinyl acetal resin was also measured for the degree of acetalization, acetyl group content, hydroxy group content, and degree of grafting by NMR. The results are shown in Table 1. The resin was also measured for the weight average molecular weight against a polystyrene standard by GPC using a column "2690 Separations Model" available from Waters, and the weight average molecular weight is shown in Table 2.

Next, 5 parts by weight of the obtained polyvinyl acetal resin was dissolved in 100 parts by weight of methanol, and the resulting solution was added dropwise to 10 parts by weight of water. The mixture was stirred under reduced pressure with the temperature maintained at 30° C. to evaporate methanol and water. Thus, polyvinyl acetal resin fine particles were obtained.

EXAMPLE 17

Into a reactor equipped with a thermometer, a stirrer, a nitrogen introduction pipe, and a condenser tube, 25 parts by weight of a polyvinyl acetal resin (degree of polymerization: 1000, degree of butyralization: 66.0 mol %, hydroxy group content: 33.0 mol %, acetyl group content: 1.0 mol %), 0.5 parts by weight of methacrylic acid, and 100 parts by weight of dimethyl sulfoxide were charged, and the polyvinylbutyral was dissolved in the mixture with stirring. Next, the reactor was flushed with nitrogen gas for 30 minutes to purge the reactor with nitrogen, and the contents of the reactor were heated to 85° C. with stirring. After 30 minutes, 0.5 parts by weight of t-butylperoxy-2-ethylhexanoate, which serves as a polymerization initiator, was diluted in 5 parts by weight of dimethyl sulfoxide, and the resulting polymerization initiator solution was added dropwise to the reactor over 3 hours. Then, the mixture was further reacted at 85° C. for 3 hours. The reaction solution was cooled, followed by precipitation into water three times. The precipitates were sufficiently dried. Thus, a polyvinyl acetal resin grafted with methacrylic acid was obtained. The resulting polyvinyl acetal resin was measured by NMR, and found to have an ionic functional group content of 0.15 mmol/g. The polyvinyl acetal resin was also measured for the degree of acetalization, acetyl group content, hydroxy group content, degree of grafting, and weight average molecular weight in the same manner as in Example 16. The results are shown in Table 2.

Polyvinyl acetal resin fine particles were prepared from the obtained polyvinyl acetal resin in the same manner as in Example 16.

EXAMPLE 18

Into a reactor equipped with a thermometer, a stirrer, a nitrogen introduction pipe, and a condenser tube, 25 parts by weight of a polyvinyl acetal resin (degree of polymerization: 800, degree of butyralization: 65.0 mol %, hydroxy group content: 33.8 mol %, acetyl group content: 1.2 mol %), 0.5 parts by weight of dimethylaminoethyl methacrylate, and 100 parts by weight of dimethyl sulfoxide were charged, and the polyvinylbutyral was dissolved in the mixture with stirring. Next, the reactor was flushed with nitrogen gas for 30 minutes to purge the reactor with nitrogen, and the contents of the reactor were heated to 85° C. with stirring. After 30 minutes, 0.5 parts by weight of t-butylperoxy-2-ethylhexanoate, which serves as a polymerization initiator, was diluted with 5 parts by weight of dimethyl sulfoxide, and the resulting polymerization initiator solution was added dropwise to the reactor over 3 hours. Then, the mixture was further reacted at 85° C. for 3 hours, and the reaction solution was cooled, followed by precipitation into water three times. The precipitates were sufficiently dried. Thus, a polyvinyl acetal resin grafted with dimethylaminoethyl acrylate was obtained. The resulting resin was measured by NMR, and found to have an ionic functional group content of 0.1 mmol/g. The polyvinyl acetal resin was also measured for the degree of acetalization, acetyl group content, hydroxy group content, degree of grafting, and weight average molecular weight in the same manner as in Example 16. The results are shown in Table 2.

Polyvinyl acetal resin fine particles were prepared from the obtained polyvinyl acetal resin in the same manner as in Example 16.

EXAMPLE 19

Polyvinyl acetal resin fine particles were prepared in the same manner as in Example 16, except that 15 parts by weight of the obtained polyvinyl acetal resin was dissolved in 100 parts by weight of methanol.

EXAMPLE 20

Polyvinyl acetal resin fine particles were prepared in the same manner as in Example 16, except that 0.5 parts by weight of the obtained polyvinyl acetal resin was dissolved in 100 parts by weight of methanol.

EXAMPLE 21

A polyvinyl acetal resin grafted with sodium 2-sulfoethyl methacrylate was obtained by performing the same procedures as in Example 16, except that the polyvinyl acetal resin material used had a degree of polymerization of 300, a degree of butyralization of 68.0 mol %, a hydroxy group content of 31.0 mol %, and an acetyl group content of 1.0 mol %, and the amount of sodium 2-sulfoethyl methacrylate was changed to 4 parts by weight. The obtained resin was measured by NMR, and found to have an ionic functional group content of 0.4 mmol/g. The polyvinyl acetal resin was also measured for the degree of acetalization, acetyl group content, hydroxy group content, degree of grafting, and weight average molecular weight in the same manner as in Example 16. The results are shown in Table 2.

Polyvinyl acetal resin fine particles were prepared from the obtained polyvinyl acetal resin in the same manner as in Example 16.

EXAMPLE 22

A polyvinyl acetal resin grafted with sodium 2-sulfoethyl methacrylate was obtained by performing the same procedures as in Example 16, except that the polyvinyl acetal resin material used had a degree of polymerization of 3300, a degree of butyralization of 67.0 mol %, a hydroxy group content of 32.0 mol %, and an acetyl group content of 1.0 mol %, and the amount of sodium 2-sulfoethyl methacrylate was changed to 2 parts by weight. The resin was measured by NMR, and found to have an ionic functional group content of 0.2 mmol/g. The polyvinyl acetal resin was also measured for the degree of acetalization, acetyl group content, hydroxy group content, degree of grafting, and weight average molecular weight in the same manner as in Example 16. The results are shown in Table 2.

Polyvinyl acetal resin fine particles were prepared from the obtained polyvinyl acetal resin in the same manner as in Example 16.

EXAMPLE 23

In 1000 parts by weight of pure water, 100 parts by weight of a polyvinyl alcohol (degree of polymerization: 1000, degree of saponification: 99 mol %, amount of copolymerized acrylic acid: 0.7 mol %) was added and dissolved by stirring at 90° C. for approximately 2 hours.

The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford a polyvinyl acetal resin as white powder.

The obtained polyvinyl acetal resin was measured by NMR, and found to have a degree of butyralization of 67.6 mol %, a hydroxy group content of 30.7 mol %, an acetyl group content of 1 mol %, and an ionic functional group content of 0.1 mmol/g.

Polyvinyl acetal resin fine particles were prepared from the obtained polyvinyl acetal resin in the same manner as in Example 16.

EXAMPLE 24

A polyvinyl acetal resin grafted with sodium 2-sulfoethyl methacrylate was obtained by performing the same procedures as in Example 16, except that the polyvinyl acetal resin material used had a degree of polymerization of 1000, a degree of butyralization of 48.0 mol %, a degree of acetoacetalization of 24 mol %, a hydroxy group content of 27.0 mol %, and an acetyl group content of 1.0 mol %.

The obtained resin was measured by NMR, and found to have an ionic functional group content of 0.1 mmol/g. The polyvinyl acetal resin was also measured for the degree of acetalization, acetyl group content, hydroxy group content, degree of grafting, and weight average molecular weight in the same manner as in Example 16. The results are shown in Table 2.

Polyvinyl acetal resin fine particles were prepared from the obtained polyvinyl acetal resin in the same manner as in Example 16.

COMPARATIVE EXAMPLE 5

In 150 parts by weight of methanol, 10 parts by weight of a polyvinyl acetal resin (degree of polymerization: 800, degree of butyralization: 68.0 mol %, hydroxy group content: 31.0 mol %, acetyl group content: 1.0 mol %) was dissolved, and 10 parts by weight of water was added dropwise to the resulting solution.

When the mixture was stirred under reduced pressure with the temperature maintained at 30° C. to evaporate methanol and water, aggregates of the polyvinyl acetal resin occurred. Thus, fine particles of the polyvinyl acetal resin could not be obtained.

COMPARATIVE EXAMPLE 6

A polyvinyl acetal resin grafted with 2-hydroxyethyl methacrylate was obtained by performing the same procedures as in Example 16, except that 2-hydroxyethyl methacrylate was used in place of sodium 2-sulfoethyl methacrylate. The obtained resin was measured by NMR, and found to have an ionic functional group content of 0 mmol/g. The polyvinyl acetal resin was also measured for the degree of acetalization, acetyl group content, hydroxy group content, degree of grafting, and weight average molecular weight in the same manner as in Example 16. The results are shown in Table 2.

Five parts by weight of the obtained polyvinyl acetal resin was dissolved in 100 parts by weight of methanol, and 10 parts by weight of water was added dropwise to the solution. When the mixture was stirred under reduced pressure with the temperature maintained at 30° C. to evaporate methanol and water, aggregates of the polyvinyl acetal resin occurred. Thus, an aqueous dispersion of fine particles could not be obtained.

COMPARATIVE EXAMPLE 7

In 1000 parts by weight of pure water, 100 parts by weight of a polyvinyl alcohol (degree of polymerization: 1000, degree of saponification: 99 mol %) was added, and dissolved by stirring at 90° C. for approximately 2 hours.

The solution was cooled to 40° C., and 80 parts by weight of hydrochloric acid (concentration: 35% by weight) was added. The mixture was then cooled to 4° C., followed by the addition of 70 parts by weight of n-butylaldehyde. While the temperature was maintained at 4° C., the acetalization was allowed to proceed to give precipitates of the reaction product.

Subsequently, the temperature was maintained at 30° C. for 3 hours to complete the reaction. Neutralization, water rinse, and drying were performed by standard methods to afford polyvinyl acetal resin particles having a degree of butyralization of 68 mol %, a hydroxy group content of 31 mol %, and an acetyl group content of 1 mol %.

(How to Evaluate)
The polyvinyl acetal resin fine particles were evaluated for their properties by the methods described below. Table 2 shows the results.

(1) Measurement of Particle Size
The polyvinyl acetal resin fine particles were measured for the volume average particle size and volume-based particle size distribution with a laser diffraction/scattering particle size distribution analyzer (LA-950 available from HORIBA, Ltd.)

(2) Measurement of Average Sphericity
The polyvinyl acetal resin fine particles were measured for the average sphericity by observation with a scanning electron microscope. The average sphericity was calculated by measuring the sphericity of randomly selected 100 polyvinyl acetal resin fine particles in an electron microscopic photograph by image analysis of the individual particles with an image analyzer, and averaging their sphericity values.

(3) Evaluation of Water Dispersibility
One part by weight of each of the polyvinyl acetal resin fine particle samples was individually added to 9 parts by weight of water, and exposed to ultrasonic radiation to prepare aqueous dispersions of the polyvinyl acetal resin fine particles. The dispersions were left standing for 24 hours, and evaluated for the dispersibility of the polyvinyl acetal fine particles based on the following criteria.
OO (Excellent): Particles were completely dispersed without precipitates.
O (Good): Most of particles were dispersed with only a few precipitates.
x (Poor): All particles were precipitated.

(4) Evaluation of Redispersibility
The aqueous dispersions of the polyvinyl acetal fine particles were evaluated based on the following criteria for whether the polyvinyl acetal fine particles can be redispersed by stirring after precipitation of the polyvinyl acetal fine particles in a centrifuge.
OO (Excellent): Particles were completely dispersed by stirring in less than 10 minutes.
O (Good): Particles were completely dispersed by stirring for 10 minutes or more and 1 hour or less.
x: Particles were not dispersed.

(5) Evaluation of Film Uniformity
The aqueous dispersions of the polyvinyl acetal fine particles were individually applied to a PET film, and dried at 80° C. for 60 minutes, and then at 160° C. for 15 minutes. Thus, laminates of a polyvinyl acetal film and PET were obtained. Each polyvinyl acetal film was separated from PET, and evaluated for the film uniformity based on the following criteria by observation with a microscope.
OO (Excellent): No void and irregularity were observed.
O (Good): No void but some irregularities were observed.
x (Poor): Voids and irregularities were observed.

(6) Film Strength
Each of the polyvinyl acetal films was separated from PET, and subjected to a tensile test to determine the break stress and elongation.

TABLE 2

| | | Polyvinyl acetal | | | | | | | Ionic group | |
|---|---|---|---|---|---|---|---|---|---|---|
| | | Degree of acetalization (mol %) | | Acetyl | Hydroxy | Degree of | Weight | | | Ionic functional group |
| | Degree of polymerization | Degree of butyralization | Degree of acetoacetalization | group content (mol %) | group content (mol %) | grafting (% by weight) | average molecular weight | Compound | Functional group | content of resin (mmol/g) |
| Example 16 | 1000 | 65.8 | — | 1 | 32.9 | 1 | 230000 | Sodium 2-sulfoethyl methacrylate | Sulfonate | 0.05 |

TABLE 2-continued

| | | | | | | | | | | |
|---|---|---|---|---|---|---|---|---|---|---|
| Example 17 | 1000 | 65.4 | — | 1 | 32.7 | 1 | 220000 | Methacrylic acid | Carboxylic acid | 0.15 |
| Example 18 | 800 | 64.6 | — | 1.2 | 33.6 | 2 | 190000 | Dimethyl-aminoethyl methacrylate | Amino group | 0.1 |
| Example 19 | 1000 | 65.8 | — | 1 | 32.9 | 1 | 230000 | Sodium 2-sulfoethyl methacrylate | Sulfonate | 0.05 |
| Example 20 | 1000 | 65.8 | — | 1 | 32.9 | 1 | 230000 | Sodium 2-sulfoethyl methacrylate | Sulfonate | 0.05 |
| Example 21 | 300 | 66.5 | — | 1 | 30.3 | 8 | 60000 | Sodium 2-sulfoethyl methacrylate | Sulfonate | 0.4 |
| Example 22 | 3300 | 66.2 | — | 1 | 31.6 | 4 | 760000 | Sodium 2-sulfoethyl methacrylate | Sulfonate | 0.2 |
| Example 23 | 1000 | 67.6 | — | 1 | 30.7 | 1 | 220000 | Acrylic acid | Carboxylic acid | 0.1 |
| Example 24 | 1000 | 47.7 | 23.9 | 1 | 26.8 | 2 | 210000 | Sodium 2-sulfoethyl methacrylate | Sulfonate | 0.1 |
| Comparative Example 5 | 800 | 68 | — | 1 | 31 | — | 170000 | — | — | — |
| Comparatiave Example 6 | 1000 | 65.8 | — | 1 | 32.9 | — | 240000 | — | — | — |
| Comparative Example 7 | 1000 | 68 | — | 1 | 31 | — | 210000 | — | — | — |

| | Production of fine particles | | Evaluation | | | | | | | |
|---|---|---|---|---|---|---|---|---|---|---|
| | Amount of polyvinyl acetal resin (parts by weight) | Amount of organic solvent (parts by weight) | Particle size | | Average sphericity | Dispersibility | | Film uniformity | Film strength (N/mm²) | Elongation (%) |
| | | | Average (μm) | CV (%) | | Dispersibility | Redispersibility | | | |
| Example 16 | 5 | 100 | 2 | 18 | 0.99 | ○ | ○○ | ○○ | 55 | 100 |
| Example 17 | 5 | 100 | 4 | 24 | 0.98 | ○ | ○ | ○○ | 45 | 80 |
| Example 18 | 5 | 100 | 4 | 25 | 0.98 | ○ | ○ | ○○ | 50 | 80 |
| Example 19 | 15 | 100 | 15 | 28 | 0.98 | ○ | ○○ | ○○ | 50 | 100 |
| Example 20 | 0.5 | 100 | 0.2 | 14 | 0.98 | ○○ | ○○ | ○○ | 58 | 110 |
| Example 21 | 5 | 100 | 3 | 23 | 0.99 | ○ | ○○ | ○○ | 28 | 100 |
| Example 22 | 5 | 100 | 0.5 | 19 | 0.97 | ○○ | ○○ | ○○ | 80 | 100 |
| Example 23 | 5 | 100 | 8 | 33 | 0.92 | ○ | ○ | ○○ | 33 | 70 |
| Example 24 | 5 | 100 | 1 | 20 | 0.98 | ○ | ○○ | ○○ | 55 | 90 |
| Comparative Example 5 | 5 | 100 | — | — | — | — | — | — | — | — |
| Comparatiave Example 6 | 5 | 100 | — | — | — | — | — | — | — | — |
| Comparative Example 7 | — | — | 35 | 60 | 0.75 | x | Δ | x | 5 | 10 |

INDUSTRIAL APPLICABILITY

The present invention provides polyvinyl acetal fine particles for an aqueous dispersion which exhibit excellent dispersion stability in a water-containing dispersion medium, and allow for formation of a film having sufficient mechanical strength and flexibility without voids and non-uniform structures such as irregularities, an aqueous dispersion of the polyvinyl acetal fine particles for an aqueous dispersion, and a method for preparing the polyvinyl acetal fine particles for an aqueous dispersion.

The invention claimed is:

1. Polyvinyl acetal fine particles adapted for use as dispersoids in an aqueous dispersion,
   the polyvinyl acetal fine particles including a polyvinyl acetal resin with an ionic functional group, and having a volume average particle size of 10 nm to 100 μm, and a CV value of a volume-based particle size distribution of at most 40%,
   wherein the polyvinyl acetal resin has a total degree of acetalization of 40 to 80 mol % and comprises a structure unit of the following formula (1):

wherein C is the carbon atom in the polymer main chain, $R^1$ is a hydrogen atom, $R^2$ is a methylene group, and $R^3$ is a sulfonic acid group or a salt of a sulfonic acid group.

2. The polyvinyl acetal fine particles according to claim 1, wherein the polyvinyl acetal fine particles have an average sphericity of at least 0.9.

3. The polyvinyl acetal fine particles according to claim 1, wherein the polyvinyl acetal resin has an ionic functional group content of 0.01 to 1 mmol/g.

4. An aqueous dispersion comprising the polyvinyl acetal fine particles according to claim 1, dispersed in a water-containing dispersion medium.

5. A method for producing the polyvinyl acetal fine particles according to claim 1, the method comprising:
 preparing the polyvinyl acetal resin with an ionic functional group;
 dissolving the polyvinyl acetal resin in an organic solvent; and
 causing fine particles of the polyvinyl acetal to precipitate.

\* \* \* \* \*